United States Patent [19]

Zecher

[11] 4,093,557

[45] June 6, 1978

[54] PROCESS FOR INHIBITING CORROSION OF METALS IN AQUEOUS SYSTEMS

[75] Inventor: David C. Zecher, Newark, Del.

[73] Assignee: Hercules Incorporated, Wilmington, Del.

[21] Appl. No.: 723,676

[22] Filed: Sep. 16, 1976

[51] Int. Cl.² ............................................. C09K 3/00
[52] U.S. Cl. ............................ 252/389 R; 252/387; 252/393; 21/2.7 R; 210/58
[58] Field of Search ............... 252/389 R, 389 A, 393, 252/387; 21/2.7 R; 210/58; 260/29.3, 29.4

[56] References Cited

U.S. PATENT DOCUMENTS

| | | | |
|---|---|---|---|
| 2,749,305 | 10/1951 | Jursich | 210/53 |
| 3,035,091 | 5/1962 | Wygant | 260/52 D |
| 3,272,861 | 9/1966 | Riggs | 252/392 X |
| 3,293,176 | 12/1966 | White | 210/58 |
| 3,515,695 | 6/1970 | Burkett et al. | 260/47 |
| 3,589,859 | 6/1971 | Foroulis | 21/2.7 R |
| 3,637,508 | 1/1972 | Willsey | 21/2.7 R |
| 3,687,610 | 8/1972 | Gilson et al. | 21/2.7 R |
| 3,705,786 | 12/1972 | Kaye | 21/2.7 |

*Primary Examiner*—Benjamin R. Padgett
*Assistant Examiner*—Josephine L. Barr
*Attorney, Agent, or Firm*—Michael B. Keehan

[57] ABSTRACT

A process for inhibiting corrosion of metals in contact with aqueous systems is provided by maintaining in contact with metals a corrosion inhibiting composition that contains a compound containing the quinomethide group represented as follows:

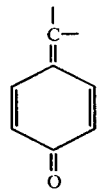

11 Claims, No Drawings

PROCESS FOR INHIBITING CORROSION OF METALS IN AQUEOUS SYSTEMS

This invention relates to nonchromate corrosion inhibitors useful in industrial open circulating cooling water systems to inhibit corrosion of the metals in contact with said circulating cooling water systems. More particularly, this invention relates to a process for inhibiting of corrosion of metal surfaces in contact with cooling water principally in open-recirculating cooling water systems by maintaining contact of the surfaces within said systems with corrosion inhibiting compounds characterized by the presence of at least one quinomethide group within the compound. In still another aspect, this invention relates to a process for inhibiting corrosion and scale deposition in industrial open-recirculating cooling water systems by maintaining contact within said system with a mixture comprising a composition containing a compound containing the quinomethide group and scale inhibitors.

In the process of this invention for inhibiting corrosion of metal surfaces in contact with recirculating water systems, a corrosion inhibiting composition is maintained within said water system. The corrosion inhibiting composition employed in the process of this invention comprises an organic compound characterized by the presence of a quinomethide in said compound, said quinomethide group being represented structurally by formula I below:

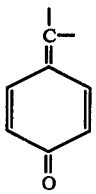

(I)

The quinomethide group can be formed, for example, by oxidation of substituted phenols such as, for example, substituted methylene salicylic acid, as follows:

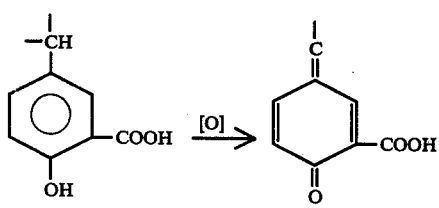

(II)

In the corrosion inhibiting process of this invention the corrosion inhibiting compositions contain compounds which are dimers, trimers and resins which contain the quinomethide group.

The compounds containing the quinomethide group which can be employed in the process of this invention are represented by formula III below:

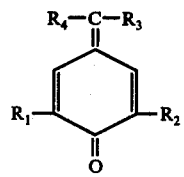

(III)

and by resins of formula IV below, which resins are at least partially oxidized phenolic resins containing at least one quinomethide group.

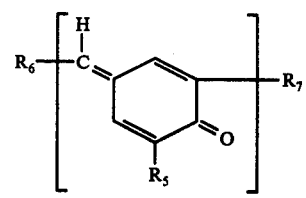

(IV)

In the above formulas $R_1$ and $R_5$ are hydrogen, carboxyl, hydroxyl, $-SO_3H$, $-NH_2$ and alkyl and alkylene radicals having up to 8 carbon atoms; $R_2$ is hydrogen or lower alkyl having 1 to 4 carbon atoms, $R_3$ is hydrogen, lower alkyl having 1 to 4 carbon atoms, aryl or substituted aryl, $R_4$ is substituted aryl, $R_6$ and $R_7$ are residues of at least partially oxidized phenolic resins. In formula III, substituted aryl radicals include, for example, aminophenyl, halophenyl such as dichlorophenyl, hydroxyphenyl, and the like.

Compounds containing the quinomethide group which can be employed in the process of this invention corresponding to formula IV can be formed by different processes such as by the oxidation of phenolic resins formed through the reaction of an aldehyde having the formula:

(V)

where R is selected from the group consisting of hydrogen and lower aliphatic groups having less than 5 carbon atoms, and phenols having the formula:

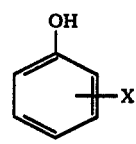

(VI)

where X is selected from the group consisting of $-OH$, $-COOH$, hydrogen, $-SO_3H$, $-NH_2$ and alkyl and alkylene radicals which have up to 8 carbon atoms. Exemplary phenolic resins which can be prepared from aldehydes and phenols, and reaction conditions for their preparation are fully disclosed in U.S. Pat. No. 3,687,610 of Ivan T. Gibson et al., issued Aug. 29, 1972, reference to which patent is hereby made.

Oxidation of phenolic resins to organic compounds containing the quinomethide group is readily accomplished by forming a mixture of the phenolic resin with a blend of concentrated sulfuric acid and sodium nitrite ($NaNO_2$). Oxidation is preferably conducted at temperatures below about 10° C.

Examples of organic compounds which contain the quinomethide group and which can be employed as a principal corrosion inhibiting compound in the process of this invention and which correspond to compounds of formula III are formaurindicarboxylic acid, triarylmethanes such as CI Mordant Violet 16, CI Mordant Violet 39 (aurintricarboxylic acid), formaurin, 5,5'-dimethylformaurindicarboxylic acid, α-alkylformaurindicarboxylic acid such as α-methylformaurindicarboxylic acid, and the like.

Formaurindicarboxylic acid, referred to sometimes hereinafter as FADA (formula VIII), can be prepared by oxidation of 5,5'-methylenedisalicylic acid (formula VII) utilizing a mixture of concentrated sulfuric acid and sodium nitrite as the oxidizing agent as illustrated by the following equation:

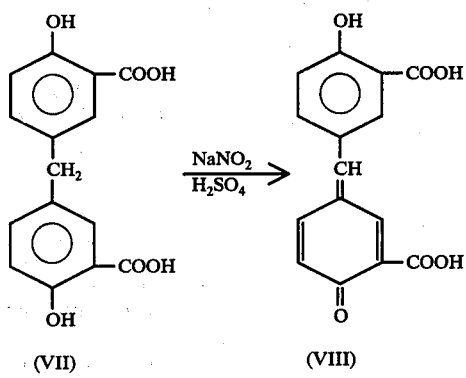

(VII)        (VIII)

Alkyl substituted formaurindicarboxylic acids such as represented by formulas IX and X below can be prepared by the processes of Arikawa, Y. and Kato, T., see Technical Reports Tohoku University 25, p. 55 (1960). Chemical Abstracts 55, 10205 (1961); also see Chemical Abstracts 57, 6604 (1962).

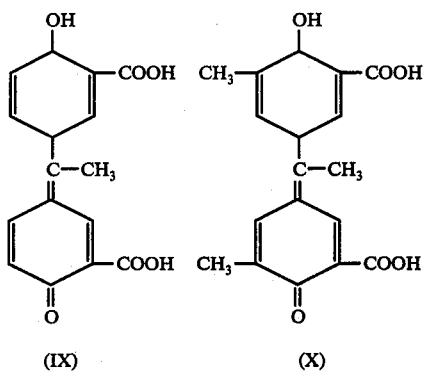

(IX)        (X)

Compounds such as those represented by formulas IX and X can be prepared, for example, by reaction of salicylic acids and aliphatic alcohols in accordance with the following reaction (XI):

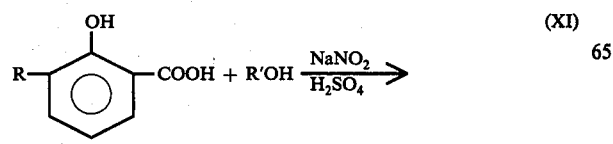  (XI)

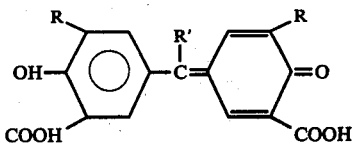

wherein R is hydrogen or alkyl having from 1 to 4 carbon atoms and R' is alkyl having 1 to 4 carbon atoms.

Triarylmethanes which are compounds containing the quinomethide group and which can be employed in the process of this invention are represented by CI Mordant Violet 16 (formula XII) also known as 2,2',2"-trimethyl aurintricarboxylic acid, and CI Mordant Violet 39 (formula XIII) also known as aurintricarbocyclic acid.

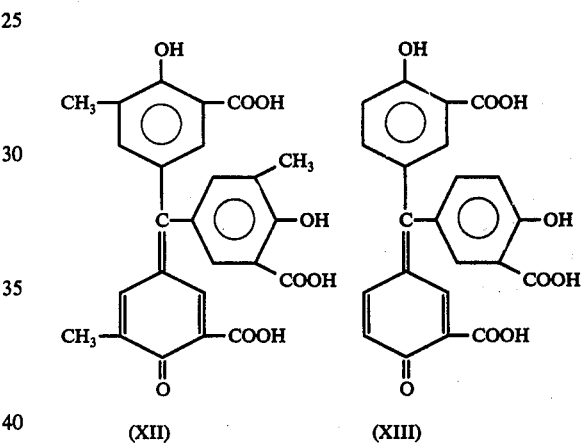

(XII)        (XIII)

formaurin (formula XV) can be prepared by oxidation of 4,4'-methylene diphenol (formula XIV) and 5,5'-dimethylformaurindicarboxylic acid (formula XVII) can be prepared by oxidation of 5,5'-methylenedi (3-methylsalicylic acid) (formula XVI) as illustrated by the following equations:

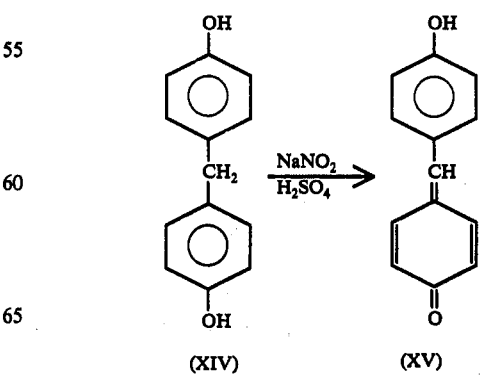

(XIV)        (XV)

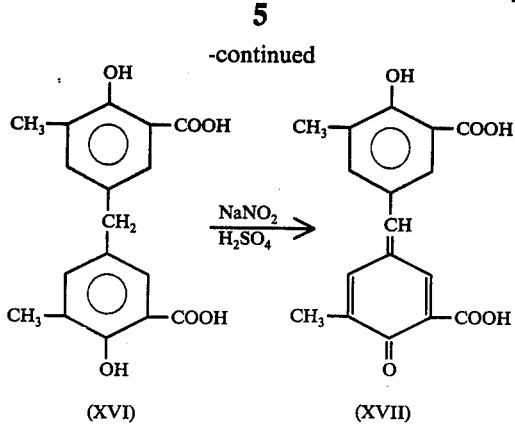

(XVI)   (XVII)

The process of this invention is more fully illustrated in the examples which follow. In all the examples the corrosion inhibitor compositions were evaluated in recirculating heat transfer corrosion tests. In these tests an aerated recirculating aqueous test solution is employed. This test solution contains 300 p.p.m. calcium hardness as $CaCO_3$; 100 p.p.m. magnesium hardness as $MgCO_3$; 10 p.p.m. alkalinity as $CaCO_3$; 1000 p.p.m. total dissolved solids which includes 400 p.p.m. chloride as NaCl and 500 p.p.m. sulfate as $Na_2SO_4$. The test solution is adjusted to a pH of 6.5–7.0 with hydrochloric acid.

Short Term Corrosion Tests

The test solution is prepared from a synthetic cooling water with corrosion and/or scale inhibitors added. The test solution is placed in a 3 liter glass basin from which it is pumped by a centrifugal pump to a test apparatus having a heat transfer section consisting of a 10 inch long, ¾ inch inside diameter modified glass condenser with plastic nuts and washers into which is inserted the polished tubular test specimen. The test specimen is a 12 inch long, 0.5 inch outside diameter, 0.382 inch inside diameter, cold drawn mild steel tube. The test solution passes through the annular space between the glass jacket and the tubular specimen. About 15.7 sq. in. of this tube is exposed to the test solution. A cartridge heater is inserted into the tubular specimen to provide heat. The test solution flows from this heat transfer section through a condenser and back to the basin. The test solution is constantly aerated by means of an air sparge in the basin. The tubular specimens are exposed to the recirculating test solution for 20 hours. After 20 hours the test specimen is removed from the test apparatus. By control of the exposed surface area of the test specimen and exposure time, comparison of weight loss and deposition data for the test specimen in contact with different inhibitors is possible. The important parameters of the test procedure employed in evaluation of corrosion inhibitors employing the process of this invention are (a) 3000 ml. of test solution, (b) volume of test solution/surface area ratio of 190 cc. per sq. in., (c) a test solution flow rate of about 2 gal. per min., (d) aeration rate of 500 cc. per min., (e) the velocity of test solution in the heat transfer section of approximately 2.2–2.4 ft. per sec., (f) a temperature of 55° C. ± 1° C. and (g) a heat flux input calculated at 9900 BTU's per hr. per sq. ft. of test specimen.

Long Term Corrosion Test

The long term corrosion test is similar to the short term test but with provisions for periodic addition of fresh test solution and discharge of excess test solution over a pre-established volume). In the long term test approximately 52–54 ml. of fresh test solution containing a maintenance dosage of inhibitor is added once every 24 min. (60 additions per day) to the basin containing the test solution. The total test period is 14 days unless corrosion protection has broken down completely, in which case the test is terminated after 7 days. In this test, the test solution is circulated from the basin to the heat transfer section, then to a glass block containing a Corrator probe, through a condenser and back to the basin. The Corrator probe is a two-electrode probe developed and sold by Magna Corporation designed to measure instantaneous corrosion rates. Periodic corrosion rate measurements with a Corrator probe exposed to the test solution enable measurement of corrosion rate versus exposure time. An initial high level of inhibitor dosage in the test solution (usually 3 to 10 times as great as the maintenance dosage) is used for up to one day and the maintenance dosage referred to above is added during the balance of the test period. Throughout the long term corrosion test, test solution is periodically discharged from the test apparatus and fresh test solution equivalent to that discharged is added.

Evaluation of Corrosion Data

After exposure of test specimens to either short term or long term corrosion tests, the test specimens are removed from the test apparatus, dried, weighed, immersed in 5% sulfuric acid (containing an amine-based corrosion inhibitor) for 3 min. at 70° C. to remove all scale and corrosion products, dried and reweighed. The difference between the original and final weight of the test specimen is referred to herein as the "weight loss" and is a measurement of the amount of corrosion that the tubular specimen underwent. The difference between the weight of the test specimen after exposure, before and after treatment with inhibited acid, is referred to herein as "scale deposition" and is a measurement of the amount of scale and corrosion products deposited on to the surface of the specimen. In the tables which follow, under the heading "Weight Loss, Mg (Deposition, Mg)" the values not in parenthesis are the corrosion data and the values in parenthesis are the deposition data.

In the examples which follow and throughout this specification, parts and percentages are by weight unless otherwise specified. In the examples and tables which follow the following terms sometimes will be abbreviated as set forth in the bracketed word following each term:

5,4'-methylenedisalicylic acid (MDSA);
formaurindicarboxylic acid (FADA);
5,5'-dimethylformaurindicarboxylic acid (DMFADA);
4,4'-methylenediphenol (MDP);
formaurin (FA);
α-methylformaurindicarboxylic acid (α-MFADA);
aurintricarboxylic acid (ATA); and
aminotris(methylenephosphonic acid) (AMP).

EXAMPLES 1–4

The following examples illustrate preparation of formaurindicarboxylic acid from 5,5'-methylenedisalicyclic acid in varying degrees of purity.

EXAMPLE 1

Ten grams (0.145 mole) of $NaNO_2$ was slowly added to 60 ml. of concentrated $H_2SO_4$ in a 250 ml. Erylenmeyer flask cooled to below 10° C. with ice water. To this mixture 20 grams (0.07 mole) MDSA was added slowly with stirring and the temperature of the resulting admixture maintained below 10° C. The solution turned red almost immediately upon addition of the MDSA and frothed occasionally. After all the MDSA was added, the admixture was stirred for one hour and the temperature was maintained below 10° C. The ice water bath was removed from the mixture and stirring of the mixture was continued for an additional hour. The reaction mixture was then poured into 4 liters of cold distilled water. A red precipitate formed. The precipitate was filtered from the water, was washed with water and dried to provide 18.5 grams of red powder having a melting point of greater than 300° C. The product was identified by UV absorption as containing a substantial amount of FADA. The purity of the FADA produced was evaluated using UV-visible spectroscopy. FADA has a visible absorption peak near 525 m$\mu$ (log $\epsilon \simeq 2.93$) as a $5 \times 10^{-5}$ molar aqueous solution. Visible absorption at 525 m$\mu$ for the FADA was 0.70 using a solution of 40 mg. of solids per liter of solution, with the pH of the solution adjusted to about 2.0 with Hcl, and using a 10 cm. cell. Utilizing a sample of FADA prepared by the process of Smith, W. H.; E. E. Sager and I. J. Siewers, Analytical Chemistry, 21, p. 1334 (1949) as a standard for 100% FADA, the purity of the FADA prepared in this example was calculated as 53%.

EXAMPLE 2

A similar reaction to that of example 1 was carried out utilizing 5 grams (0.0174 mole) of MDSA with 5 grams (0.072 mole) $NaNO_2$ in 30 ml. of concentrated sulfuric acid. Following the procedures of example 1 a precipitate was recovered, washed with water and dried to provide 5 grams of a red solid having a melting point of >300° C. Utilizing ultraviolet-visible spectroscopy following the procedure of example 1, the material was identified as FADA having an absorption peak at 525 m$\mu$ of 0.96. The purity of the material calculated as 73%.

EXAMPLE 3

A similar reaction to that of example 1 was carried out utilizing 10 grams (0.035 mole) MDSA with 12.5 grams (0.18 mole) $NaNO_2$ in 60 ml. concentrated sulfuric acid. The reaction mixture was stirred for 1 hour and maintained at a temperature below 10° C. with ice water. The reaction mixture was then removed from the ice water and stirred for 3 hours at room temperature. The reaction mixture was poured into cold distilled water and 9.6 grams of a red solid precipitate formed. The material was identified following the test procedure of example 1 as FADA having an absorption at 525 m$\mu$ of 1.06 and a calculated purity of 80%.

EXAMPLE 4

Two portions of 5 grams $NaNO_2$ and 30 ml. concentrated sulfuric acid were prepared at 5° C. Then 15 grams (0.052 mole) MDSA was added slowly with stirring to 1 portion of the $NaNO_2$ sulfuric acid mixture and stirred for 15 minutes. The reaction mixture turned deep red and became viscous. The second portion of $NaNO_2$ and sulfuric acid was added to the first reaction mixture and stirring of the resulting reaction mixture was continued for 1 hour at temperatures under 10° C. The reaction mass was then removed from the source of cooling and stirred at room temperature for an additional 16 hours. Following the procedure of example 1, 15 grams of bright red solids were collected. The bright red solids were identified following the test procedure of example 1 as FADA having an absorption at 525 m$\mu$ of 1.32 with a calculated purity of 100%.

The following example illustrates preparation of FA from MDP.

EXAMPLE 5

Five grams (0.025 mole) MDP was added to 5 grams $NaNO_2$ in 30 ml. of concentrated $H_2SO_4$ and reacted for 1 hour at 5°–10° C. Cooling water was removed from the reaction vessel and the reaction was continued for 1 hour at ambient temperature (22° C.). The reaction mass was poured into cold water and reddish-brown precipitate formed. About 1.8 grams of the precipitate was recovered. The material was analyzed by infrared and by UV-visible spectroscopy following the procedure of example 1. The UV-visible spectrum in alcohol showed peaks at 280 m$\mu$($\alpha = 28$) and 450 m$\mu$($\alpha = 5$). Nuclear magnetic resonance absorption showed a broad band from 2.2–3.5 $\tau$. The material was identified as FA.

The following example illustrates preparation of $\alpha$-MFADA by reaction of salicylic acid and acetaldehyde following the process of Arikawa et al., CA 55, 10205 (1961).

EXAMPLE 6

One gram of sodium nitrite was added to 100 ml. cold (about 10° C.) concentrated sulfuric acid and 5 grams (0.036 mole) of salicylic acid was added to the sodium nitrite-sulfuric acid mixture. Then 0.8 gram (0.018 mole) acetaldehyde ($CH_3CHO$) was added dropwise at room temperature to the sodium nitrite-sulfuric acid-salicylic acid mixture and the resulting reaction mass was stirred for 3 hours to give a dark brown solution. The reaction mass was then heated at 60°–70° C. for an additional 3 hours during which time the color of the reaction mass turned to a dark purple. When the reaction mass was poured into 2 liters of cold water, the solution turned brown and a dark brown precipitate formed. The precipitate was filtered, washed with water and dried. 0.5 Gram brown solids was recovered. After standing for 3 days the filtrate turned from brown to violet and a dark purple precipitate formed. The violet filtrate was filtered and purple solids recovered. The solids were washed and dried. 0.6 Gram purple solids was recovered. The UV-visible spectra of the brown solids in aqueous solution gave no visible absorption. The UV-visible spectra of the purple solids in aqueous solution gave strong absorptions at 525 m$\mu$ ($\alpha = 14$) and 600 m$\mu$ ($\alpha = 11$). The purple solids were identified as $\alpha$-MFADA.

EXAMPLE 7

Five grams of a resin prepared by reaction of salicylic acid and formaldehyde in accordance with the teaching of U.S. Pat. No. 3,687,610 (mole ratio of formaldehyde to salicylic acid 1.16:1) was reacted with 5 grams sodium nitrite in 30 ml. concentrated sulfuric acid at 10° C. for 1 hour. An oxidation reaction took place and the oxidation was then continued at room temperature for 1 hour. The reaction mixture was then poured into cold water following the procedure of example 1 and 5 grams of oxidized resin was recovered as a red powder. The reaction was repeated utilizing a three-fold increase in the quantities of reactants and 12.2 grams of red, solid oxidized resin was recovered. The oxidized resin was analyzed by UV-visible spectroscopy and was found to contain quinomethide groups.

EXAMPLE 8

Five grams of a resin prepared by reaction of salicylic acid and formaldehyde in accordance with the teaching of U.S. Pat. No. 3,687,610 (mole ratio of formaldehyde to salicylic acid 0.55:1) was reacted with 5 grams of sodium nitrite in 30 ml. concentrated sulfuric acid at 10° C. for 1 hour and then at room temperature for 1 hour. The resulting admixture was poured into cold water following the procedure of example 1 and 4.5 grams of orange-red oxidized solid resin was recovered. The oxidized resin was analyzed by UV-visible spectroscopy and was found to contain quinomethide groups.

EXAMPLES 9–13

The oxidized salicylic acid-formaldehyde resins containing quinomethide groups prepared in examples 7 and 8 are compared with unoxidized salicylic-formaldehyde resins, from which they are prepared, and with a control (example 13) in short term corrosion tests. In these tests these materials were evaluated in combination with zinc. The zinc is in the form of $ZnSO_4 \cdot H_2O$. Results of the short term tests, set forth in Table 1 below, show that the oxidized resins containing the quinomethide group exhibit better corrosion inhibiting properties than the unoxidized resins from which they were prepared.

Table 2

| Ex. No. | Maintenance Inhibitor Dosage ppm.[a] | Steel Tubular Specimen Corr Rate mpy[b] | Steel Tubular Specimen Deposition mg/cm$^2$ | Corrator Corr Rate, mpy, after: 1 Day | 4 Days | 7 Days | 11 Days | 14 days |
|---|---|---|---|---|---|---|---|---|
| 14 | 25 FADA (Ex. 1)/5 Zn | 3.3 | 2.7 | 1.4 | 1.6 | 1.6 | 1.8 | 1.7 |
| 15 | 20 FADA (Ex. 1)/5 Zn | 23 | — | 2.8 | 3.1 | 3.0 | 16 | 70 |
| 16 | 20 FADA (Ex. 4)/5 Zn | 6.9 | 8.0 | 1.9 | 1.8 | 2.0 | 2.7 | 3.0 |
| 17 | 25 Resin of (Ex. 7)/5 Zn | 8.1 | 9.1 | 3.3 | 1.9 | 1.8 | 2.8 | 5.3 |
| 18 | 20 Resin of (Ex. 7)/5 Zn | 46 | — | 2.4 | 3.6 | 36 | 100 | — |
| 19 | 30 Resin of (Ex. 10)/5 Zn[c] | 36 | — | 5.7 | 60 | 68 | [d] | [d] |
| 20 | 25 Resin of (Ex. 10)/5 Zn[c] | 20 | — | 6.2 | 4.5 | 95 | [d] | [d] |
| 21 | None | >100 | | | | | | |

[a]Initial inhibitor dosages 50–100 ppm. Inhibitor containing quinomethide group and used up to 1 day prior to adding maintenance dosages.
[b]mpy = mils/year
[c]Zn = $ZnSO_4 \cdot H_2O$
[d]Tests terminated after 7 days due to breakdown in corrosion protection.

Results of the tests show that in example 14, 25 ppm of FADA with zinc gave good corrosion protection. In example 6 higher purity FADA (Ex. 4) provided good corrosion-deposition protection at 20 p.p.m. concentration with zinc. Comparison of examples 17 and 18 of the corrosion-deposition data for resins of example 7 containing quinomethide groups show that at a maintenance dosage of 25 p.p.m. of the resin with 5 p.p.m. zinc reasonable corrosion inhibiting properties are obtained.

EXAMPLES 22–26

Compositions containing FADA, α-MFADA, DMFADA and FA were tested in short terms corrosion tests heretofore described to determine the corrosion inhibiting and scale inhibiting properties of compositions containing the quinomethide groups prepared in examples 1, 4, 5 and 6. Results of the short term corrosion tests are set forth in Table 3.

Table 3

| Ex. No. | Inhibitor | Specimen Wt. Loss, Mg (Deposition, Mg) 500 ppm. | 100 ppm. +25 ppm. Zn | 25 ppm. +10 ppm. Zn |
|---|---|---|---|---|
| 22 | FADA (Ex. 1) | 106(298) | 16(39) | 31(41) |
| 23 | FADA (Ex. 4) | 141(434) | 38(126) | 75(118) |
| 24 | α-MFADA (Ex. 6) | — | — | 56(88) |
| 25 | DMFADA | — | 77(127) | — |
| 26 | FA (Ex. 5) | — | 371(525) | — |

EXAMPLES 27–29

In the following examples ATA, also known as CI

Table 1

| Ex. | Inhibitor | Wt. Loss, Mg (Deposition, Mg) 100 ppm. + 25 ppm. Zn | 50 ppm. + 25 ppm. Zn | 25 ppm. + 10 ppm. Zn | None |
|---|---|---|---|---|---|
| 9 | Oxidized Resin of Ex. 7 | 34(57) | 10(35) | 45(57) | |
| 10 | Salicyclic Acid-CH$_2$O Resin (1:1.16 mole ratio) | 47(61) | 13(30) | 111(177) | |
| 11 | Oxidized Resin of Ex. 8 | 44(82) | 42(66) | — | |
| 12 | Salicyclic Acid-CH$_2$O Resin (1:0.55 mole ratio | 119(170) | 401(586) | — | |
| 13 | Control | | | | 1268 (1356) |

EXAMPLES 14–21

Compositions containing compounds containing quinomethide groups were evaluated as corrosion inhibitors in long term corrosion tests in examples 14–21. Examples 19, 20 and 21 are control examples. Rresults of these long term corrosion tests are set forth in Table 2.

Mordant Violet 39 (Ex. 27), CI Mordant Blue I (Ex. 28) and CI Mordant Violet I (Ex. 29), all of which compounds are triarylmethanes containing the quinomethide group, are tested for corrosion inhibiting activity. These compounds were evaluated in short term corrosion tests. Results of these tests are set forth in Table 4. All compounds show corrosion inhibition activity.

Table 4

| Ex. No. | Inhibitor | Specimen Wt. Loss, Mg (Deposition, Mg) | | | | |
|---|---|---|---|---|---|---|
| | | 500 ppm. | 100 ppm. | 100 ppm. + 25 ppm. Zn | 50 ppm. + 25 ppm. Zn | 25 ppm. + 10 ppm. Zn |
| 27 | Aurintricarboxylic acid | 178(516) | 317(554) | 48(72) | 44(67) | 43(66), 68(87) |
| 28 | CI Mordant Blue 1 | — | — | 132(218) | — | — |
| 29 | CI Mordant Violet 1 | — | — | 323(482) | — | — |

Mordant Blue 1 and Violet 1 (both are α-aryl-DMFADA's) gave 132 and 323 mg. weight loss, respectively, when tested at 100 p.p.m. + 25 p.p.m. Zn. This represents 89% and 73% inhibition, respectively.

EXAMPLES 30-37

In the following examples corrosion inhibitors containing quinomethide groups were employed in combination with zinc and selected scale inhibitors. Results of utilization of the combination of corrosion inhibitors of this invention and scale inhibitors in short term corrosion tests are set forth in Table 5 below.

Table 5

| Ex. No. | Corrosion Inhibitors (p.p.m.) | Scale Inhibitors (5 p.p.m. Active) | Specimen Wt. Loss Mg(Dep, Mg) |
|---|---|---|---|
| 30 | 25 FADA (Ex. 1)/10 Zn | Allyl acetate-maleic anhydride copolymer | 67(132) |
| 31 | 25 FADA (Ex. 1)/10 Zn | Sodium polyacrylate | 36(52) |
| 32 | 25 FADA (Ex. 1)/10 Zn | AMP[a] | 15(27) |
| 33 | 25 FADA (Ex. 3)/10 Zn | AMP[a] | 36(49) |
| 34 | 25 FADA (Ex. 4)/10 Zn | AMP[a] | 113(168) |
| 35 | 25 ATA/10 Zn | AMP[a] | 51(83) |
| 36 | 25 Oxidized Resin (Ex. 7)/10 Zn | AMP[a] | 25(53) |
| 37 | None | None | 1268(1356) |

[a]AMP is aminotris(methylenephosphonic acid).

EXAMPLES 38-44

Long term corrosion tests were run to further evaluate the use of compositions containing the quinomethide group with combinations of scale inhibitors. Results of these long term corrosion tests are set forth in Table 6.

composition of Example 40 as measured by Corrator corrosion rates.

In the corrosion inhibiting process of this invention the amount of the compound containing quinomethide groups which must be added to the water system to provide reasonable corrosion and scale inhibition protection will vary depending primarily upon the severity of the corrosion and scale deposition problems encountered and upon the particular compound employed. Maintenance dosages of the compound containing quinomethide groups will also vary depending upon the effectiveness of the particular compound chosen and the actual conditions of use. Maintenance dosages of from about 20-200 p.p.m. of a compound containing the quinomethide group are employed in recirculating water systems to inhibit corrosion of metal surfaces. Generally, dosages of from about 20-100 p.p.m. are satisfactory.

The corrosion inhibiting compounds containing quinomethide groups are preferably employed in combination with water-soluble zinc salts such as $ZnSO_4$, $ZnCl_2$ and $Zn(NO_3)_2$. The amount of zinc employed will vary depending upon the particular compound containing quinomethide groups selected as the principle corrosion inhibitor and upon the severity of the corrosion problem. Maintenance dosages of zinc of from about 5-100 p.p.m. by weight as $Zn^{++}$ are employed with the compounds containing the quinomethide group but in general dosages of from about 5-20 p.p.m. of $Zn^{++}$ are satisfactory.

The corrosion inhibiting materials employed in the process of this invention can also be employed with scale inhibitors in addition to water-soluble zinc compounds. Other suitable scale and corrosion inhibiting compounds which can be employed include, without Table 6

| Ex. No. | Maintenance Inhibitor Dosage[a,b,c] | Steel Tubular Specimen | | Corrator Corr Rate, mpy, after: | | | | |
|---|---|---|---|---|---|---|---|---|
| | | Corr Rate (Mils/yr.) | Deposition (mg/cm²) | 1 Day | 4 Days | 7 Days | 11 Days | 14 Days |
| 38 | 20 FADA/5 Zn/5 AMP | 1.5 | 2.2 | 1.1 | 0.6 | 0.6 | 0.6 | 0.5 |
| 39 | 15 FADA/5 Zn/2.5 AMP | 2.0 | 2.5 | 0.6 | 0.4 | 0.5 | 0.5 | 0.5 |
| 40 | 15 FADA/2.5 Zn/5 AMP | 0.8 | 0.7 | 0.9 | 0.6 | 0.6 | 0.6 | 0.6 |
| 41 | 15 FADA/1.25 Zn/5 AMP | 51 | — | 1.1 | 1.0 | 1.9 | 40 | 52 |
| 42 | 15 FADA/0 Zn/5 AMP[d] | 9.4 | — | 1.3 | 1.4 | 3.7 | 8.0 | 75 |
| 43 | 10 FADA/2.5 Zn/2.5 AMP | 44 | — | 1.1 | 3.8 | 100 | — | — |
| 44 | 15 Oxidized Resin (Ex. 7)/2.5 Zn/5 AMP | 1.6 | 1.7 | 1.4 | 1.3 | 1.1 | 1.3 | 1.1 |

[a]Initial high level inhibitor dosages of 25-33 p.p.m. FADA (or Oxidized Resin of Ex. 7) with 10 p.p.m. Zn and 10 p.p.m. AMP were normally used for up to 1 day of these tests, followed by the maintenance dosages indicated.
[b]Inhibitor dosage designations such as 20 FADA/ Zn/5 AMP means 20 p.p.m. FADA + 5 p.p.m. $Zn^{++}$ + 5 p.p.m. AMP
[c]The initial high level dosage included 10 p.p.m. Zn to insure adequate film formation initially.
[d]The initial high level dosage included 10 p.p.m. Zn to insure adequate film formation initially; the maintenance treatment had no zinc.

Good corrosion and scale inhibition of steel in contact with test solution was obtained using as the inhibitor a maintenance dosage of a composition comprising 15 p.p.m. FADA (Ex. 1)/2.5 p.p.m. Zn/5 p.p.m. AMP (Ex. 40). Tests using compositions with lower zinc concentrations (Ex. 41 and 42) or lower FADA concentrations (Ex. 43) provided corrosion and scale inhibition protection but were less effective than the limitation inorganic polyphosphates such as sodium tripolyphosphate; organophosphonates such as AMP; orthophosphates such as sodium dihydrogen phosphate; copper-specific inhibitors such as sodium mercaptobenzothiazole and tolyltriazole; sodium polyacrylates; lignin and tannin derivatives such as sodium ligninsulfonate; and chelants such as citric acid.

The process of this invention is applicable to inhibiting corrosion of and scale deposition on all metals, e.g., ferrous and nonferrous, subject to corrosion and/or scale deposition in circulating water systems. These metals include, e.g., mild steel, cast iron, zinc, copper, copper-based alloys, and aluminum.

What I claim and desire to protect by Letters Patent is:

1. A process for inhibiting corrosion of metal surfaces in contact with recirculating water systems comprising maintaining within said systems from about 20 p.p.m. to about 200 p.p.m. by weight of a corrosion inhibiting composition containing a compound containing at least one quinomethide group selected from compounds of formula I

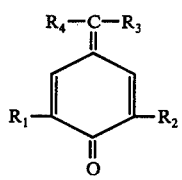

(I)

and resins of formula II which are at least partially oxidized phenolic resins containing at least one quinomethide group

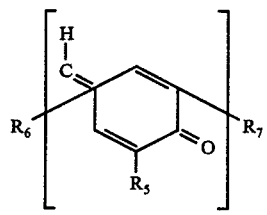

(II)

in which formulas $R_1$ and $R_5$ are hydrogen, carboxyl, hydroxyl, —$SO_3H$, —$NH_2$ and alkyl and alkylene radicals having up to 8 carbon atoms; $R_2$ is hydrogen or lower alkyl having 1 to 4 carbon atoms; $R_3$ is hydrogen or lower alkyl having 1 to 4 carbon atoms, aryl or substituted aryl; $R_4$ is substituted aryl; $R_6$ and $R_7$ are residues of at least a partially oxidized phenolic resin.

2. The process of claim 1 in which a water-soluble zinc compound is employed in combination with the corrosion inhibiting composition in an amount of from about 5 p.p.m. to about 100 p.p.m. of the recirculating water system.

3. The process of claim 1 in which the corrosion inhibiting composition comprises formaurindicarboxylic acid.

4. The process of claim 1 in which the corrosion inhibiting composition comprises 2,2',2" trimethyl aurintricarboxylic acid.

5. The process of claim 1 in which the corrosion inhibiting composition comprises aurintricarboxylic acid.

6. The process of claim 1 in which the corrosion inhibiting composition comprises formaurin.

7. The process of claim 1 in which the corrosion inhibiting composition comprises 5,5'-dimethylformaurindicarboxylic acid.

8. The process of claim 1 in which the corrosion inhibiting composition comprises α-alkylformaurindicarboxylic acid.

9. The process of claim 1 in which the corrosion inhibiting composition comprises at least partially oxidized phenol-aldehyde resin containing at least one quinomethide group of formula II, said phenol-aldehyde resin being formed by reaction of an aldehyde of formula III

(III)

wherein R is selected from the group consisting of hydrogen and lower aliphatic groups having less than 5 carbon atoms, and phenols having the formula IV

(IV)

where X is selected from the group consisting of —OH, —COOH, hydrogen, —$SO_3H$, —$NH_2$ and alkyl and alkylene radicals which have up to 8 carbon atoms.

10. The process of claim 9 in which the phenol-aldehyde resin which is oxidized to conform to formula III is the reaction product of formaldehyde and salicylic acid.

11. The process of claim 10 in which the mole ratio of formaldehyde to salicylic acid is about 1.16/1.0.

* * * * *

UNITED STATES PATENT AND TRADEMARK OFFICE
CERTIFICATE OF CORRECTION

PATENT NO. : 4,093,557

DATED : June 6, 1978

INVENTOR(S) : David C. Zecher

It is certified that error appears in the above-identified patent and that said Letters Patent are hereby corrected as shown below:

Col. 6, line 55, " 5,4'-methylenedisalicyclic acid (MDSA) " should read -- 5,5'-methylenedisalicyclic acid (MDSA) --.

Signed and Sealed this

Twenty-first Day of November 1978

[SEAL]

Attest:

RUTH C. MASON
Attesting Officer

DONALD W. BANNER
Commissioner of Patents and Trademarks